United States Patent [19]

Ichikawa et al.

[11] Patent Number: 5,137,853
[45] Date of Patent: Aug. 11, 1992

[54] BETA ALUMINA SINTERED BODY AND METHOD OF MANUFACTURING THE SAME

[75] Inventors: Shuichi Ichikawa, Handa; Tomonori Takahashi, Chita, both of Japan

[73] Assignee: NGK Insulators, Ltd., Japan

[21] Appl. No.: 740,096

[22] Filed: Aug. 5, 1991

[30] Foreign Application Priority Data

Aug. 13, 1990 [JP] Japan ................... 2-211538
Mar. 15, 1991 [JP] Japan ................... 3-74373

[51] Int. Cl.⁵ ............. C04B 35/02; C04B 35/10; C04B 35/16; C04B 35/18
[52] U.S. Cl. ................... 501/127; 501/103; 501/104; 501/105; 501/134; 501/135; 501/153
[58] Field of Search ............ 501/101, 103, 104, 105, 501/127, 134, 135, 153; 252/62.2, 62.58, 62.61, 62.64; 429/103, 104

[56] References Cited

U.S. PATENT DOCUMENTS 3,985,575 10/1976 Ludwig ................ 429/103
4,021,255 5/1977 Chiku et al. .......... 106/73.4

FOREIGN PATENT DOCUMENTS 1003623  1/1977 Canada .
0110712  6/1984 European Pat. Off. .
52-3411  1/1977 Japan .
52-40325 10/1977 Japan .
59-141459 8/1984 Japan .
60-251172 12/1985 Japan .
251172 12/1985 Japan .

Primary Examiner—William R. Dixon, Jr.
Assistant Examiner—Michael Marcheschi
Attorney, Agent, or Firm—Parkhurst, Wendel & Rossi

[57] ABSTRACT

A beta alumina sintered body having no tantalum component in an intergranular phase is manufactured by mixing raw materials consisting essentially of 8.0–10.0 wt % of sodium oxide, 3.0–5.5 wt % of magnesium oxide and/or 0.1–2.0 wt % of lithium oxide, 0.01–0.5 wt % of tantalum oxide, and the remainder of aluminum oxide to obtain raw material powders; forming the raw material powders to obtain a formed body; and sintering the formed body.

5 Claims, 4 Drawing Sheets

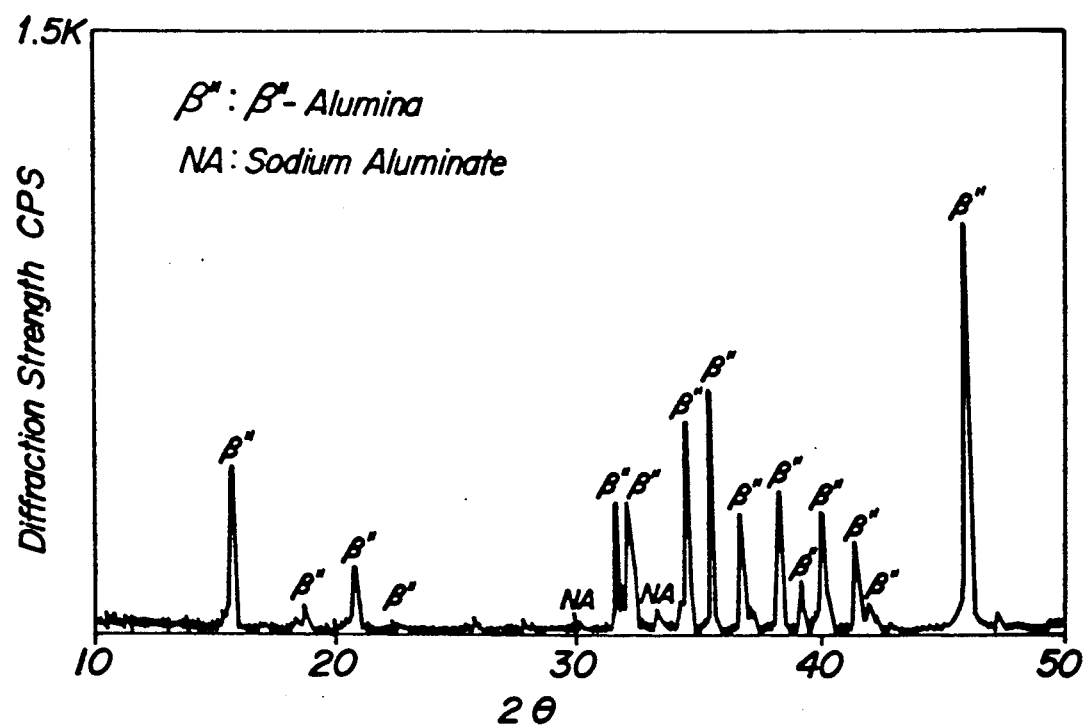
FIG_1

FIG_2
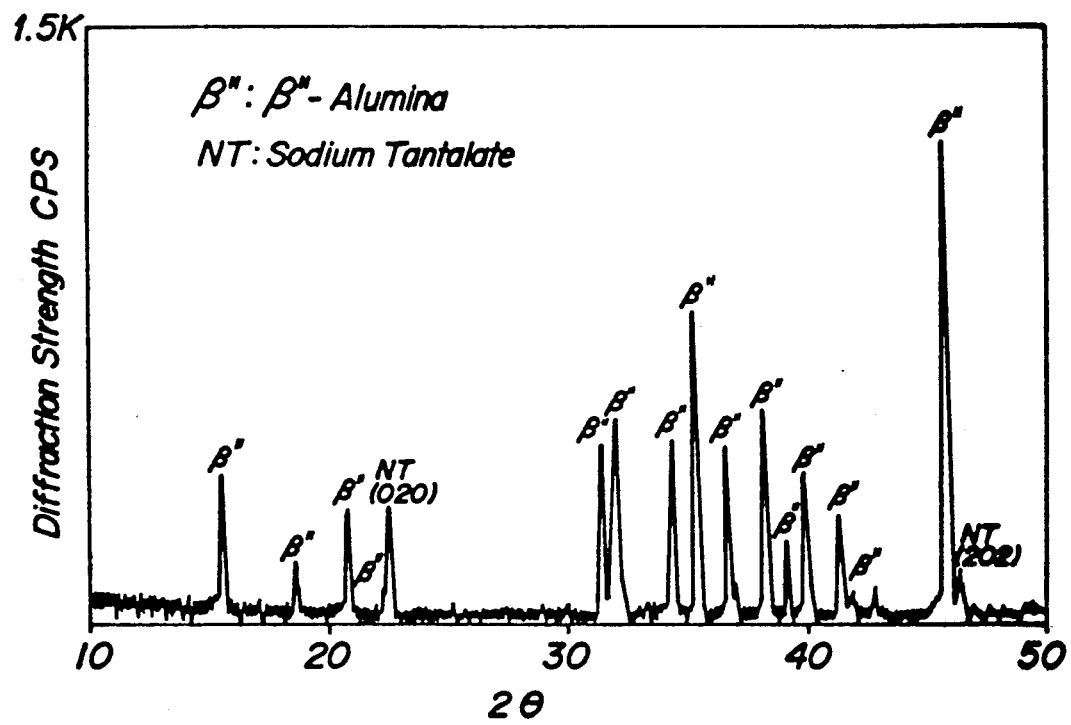

FIG_3
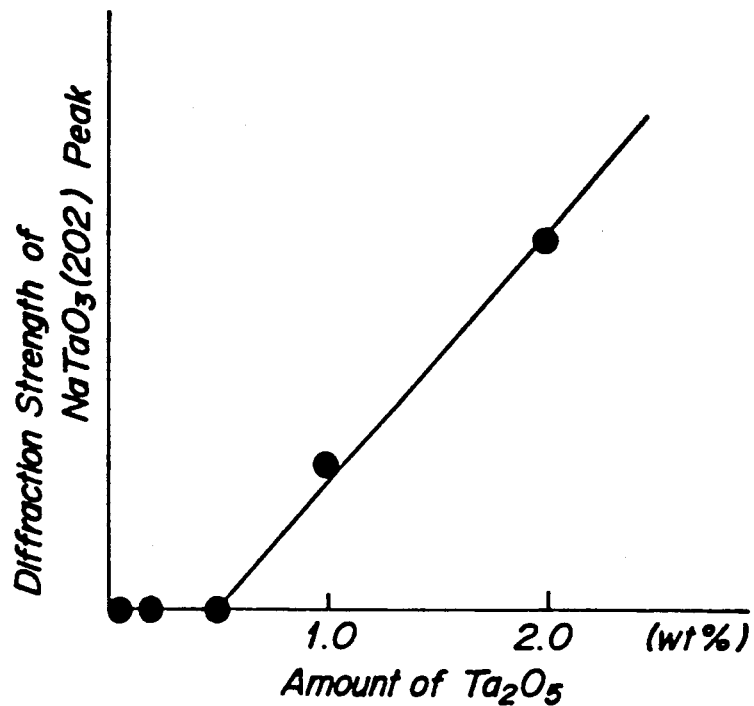
FIG_4
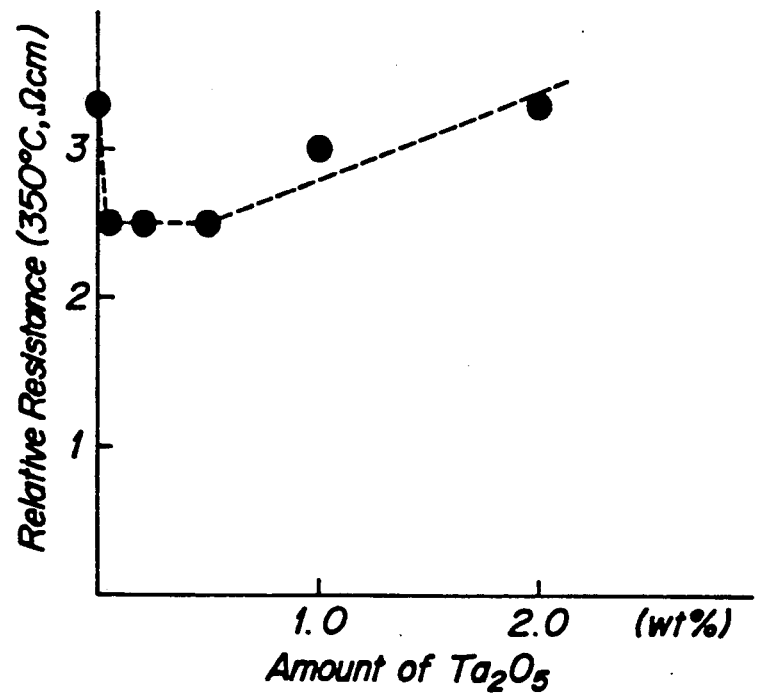

FIG_5
100 μm
FIG_6
100 μm

BETA ALUMINA SINTERED BODY AND METHOD OF MANUFACTURING THE SAME

BACKGROUND OF THE INVENTION

1. Field of the Invention

The present invention relates to a sintered body consisting mainly of beta alumina used as a solid electrolyte (hereinafter, abbreviated as beta alumina sintered body) and a method of manufacturing the same, and especially relates to a beta alumina sintered body used in a sodium sulfur secondary cell and a method of manufacturing the same.

2. Related Art Statement

Since a beta alumina sintered body shows a good sodium ion conductivity, it is used in the sodium sulfur secondary cell as a solid electrolyte for insulating metallic sodium as a cathode active material and molten sulfur as an anode active material. In this sodium sulfur secondary cell, a generation of almost all the inner resistance is due to the solid electrolyte. Therefore, in order to reduce an output power loss during a cell charge condition and also reduce a power loss during a cell discharge condition, it is preferred to minimize a relative resistance at a temperature such as 350° C. on which the beta alumina sintered body is used. Moreover, since a life of the sodium sulfur secondary cell is dependent upon that of the solid electrolyte, it is preferred that a beta alumina sintered body has a high strength.

Generally, in order to make the relative resistance lower, a crystal phase of the sintered body is formed by a $\beta''$ alumina which shows a better sodium ion conductivity as compared with $\beta$ alumina. To this end, oxides of metallic ions having less than two valences such as magnesium oxide, lithium oxide and the like are added therein so as to stabilize $\beta''$ alumina phase.

However, a relative resistance obtained according to the method mentioned above is 3.0 $\Omega$·cm at 350° C. at best, even if a composition is optimized. Moreover, a lower relative resistance can be obtained by promoting a grain growth and by decreasing a boundary resistance. However, in this case, a strength of the beta alumina sintered body is largely decreased, and thus the beta alumina sintered body can not be suitably used in a real use.

Further, as mentioned above, there is a drawback such that a temperature range for most suitably sintering the beta alumina formed body becomes narrow. That is to say, if the sintering temperature is beyond this temperature range, an extraordinarily grain growth is generated and thus a strength is decreased. Therefore, in this case, a relative resistance of the beta alumina sintered body can be decreased, but the beta alumina sintered body is not used in a real use. Actually, the beta alumina sintered body needs such characteristics that a bulk density is above 3.20 g/cm³ and a flexural strength by using four support points is above 180 MPa. Moreover, it is preferred that a temperature range for most suitably sintering the beta alumina formed body becomes wider and wider, because a temperature controlling during a sintering step becomes easier. This is particular for a mass production of the beta alumina sintered bodies using a large furnace, because a temperature distribution in the large furnace is largely varied.

In order to eliminate the drawbacks mentioned above, there is disclosed, in Japanese Patent Laid-Open Publication No. 59-141459, a technic such that an influence of calcium oxide are reduced or eliminated by adding zirconia into the beta alumina so as to improve an ion conductivity. Moreover, there is disclosed, in Japanese Patent Laid-Open Publication No. 60-251172, a technic such that a sintering temperature is lowered by adding zirconia. However, the beta alumina obtained according to the method mentioned above has also a relative resistance at 350° C. of 3.0 $\Omega$·cm at best, even if a composition is optimized.

Further, in order to improve an endurability of the beta alumina sintered body, there is disclosed, in Japanese Patent Publication No. 52-3411 and in Japanese Patent Publication No. 52-40325, a technic such that tantalum or tantalum oxide is existent in the intergranular phase by adding tantalum in the beta alumina sintered body.

However, the beta alumina sintered body obtained according to the method mentioned above can improve the endurability, but a tantalum component is precipitated in the intergranular phase as a different phase. Therefore, a resistance in the intergranular phase is increased and the relative resistance becomes high.

SUMMARY OF THE INVENTION

An object of the invention is to eliminate the drawbacks mentioned above, and to provide a beta alumina sintered body having a high sodium ion conductivity, a fine particle size and a high strength, and a method of manufacturing such a beta alumina sintered body.

Another object of the invention is to provide a beta alumina sintered body having a high sodium ion conductivity and a wider sintering temperature range and a method of manufacturing such a beta alumina sintered body.

According to the invention, a beta alumina sintered body consists essentially of 8.0-10.0 wt % of sodium oxide, 3.0-5.5 wt % of magnesium oxide and/or 0.1-2.0 wt % of lithium oxide, 0.01-0.5 wt % of tantalum oxide, and the remainder of aluminum oxide, wherein no tantalum component is existent in an intergranular phase.

Moreover, according to the invention, a method of manufacturing a beta alumina sintered body comprises the steps of mixing raw materials consisting essentially of 8.0-10.0 wt % of sodium oxide, 3.0-5.5 wt % of magnesium oxide and/or 0.1-2.0 wt % of lithium oxide, 0.01-0.5 wt % of tantalum oxide, and the remainder of aluminum oxide to obtain raw material powders; forming the raw material powders to obtain a formed body; and sintering the formed body to obtain a beta alumina sintered body wherein no tantalum component is existent in an intergranular phase.

In the construction mentioned above, it is limited that an amount of added tantalum oxide is less than 0.5 wt % and no tantalum component is existent in the intergranular phase. This is because, if tantalum oxide is added in excess i.e. above 0.5 wt % and a tantalum component is precipitated in the intergranular phase, a high sodium ion conductivity can not be achieved.

The beta alumina sintered body according to the invention is obtained by mixing raw materials consisting essentially of sodium oxide, magnesium oxide and/or lithium oxide, tantalum oxide and aluminum oxide, at a predetermined mixing ratio to obtain raw material powders; calcining the raw material powders to obtain $\beta''$ alumina powders at a predetermined temperature; and forming and sintering the $\beta''$ alumina powders. As to an addition timing of tantalum oxide, it is preferred to add it into the raw materials at mixing step or to add it into the $\beta''$ alumina powders obtained by calcining raw material powders consisting of sodium oxide, magnesium oxide and/or lithium oxide, and aluminum oxide. As to sodium oxide, magnesium oxide and/or lithium oxide, and aluminum oxide, it should be noted that use may be made of the other style of raw materials such as carbonate, nitrate, sulfate and chloride which are changed into oxides at the sintering step. Moreover, as to the sintering temperature, it is preferred to select a temperature condition such that a density becomes dense, a particle size is maintained even and fine, and a flexural strength is not decreased. When an amount of tantalum oxide is increased, a most suitable sintering temperature is decreased accordingly as shown in Table 1. A crystal phase of the sintered body consists mainly of $\beta''$ alumina, and includes a little amount of $\beta$ alumina and sodium aluminate according to circumstances.

The reason for limiting chemical compositions is as follows. If an amount of sodium oxide is less than 8 wt %, a crystallization is not completely achieved. Contrary to this, if it is more than 10 wt %, an excessive sodium aluminate remains in the crystal phase, and thus a relative resistance becomes high. Moreover, if an amount of magnesium oxide is less than 3 wt %, a generation of $\beta$ alumina phase having a high resistance is increased, and thus a relative resistance becomes high. Contrary to this, if it is more than 5.5 wt %, a spinel phase is generated in the crystal phase, and thus a density is not dense and a relative resistance becomes high. Moreover, if an amount of lithium oxide is less than 0.1 wt %, a generation of $\beta$ alumina phase having a high resistance is increased, and thus a relative resistance becomes high. Contrary of this, if it is more than 2.0 wt %, a grain growth becomes easier and thus a flexural strength is decreased. Further, if an amount of tantalum oxide is more than 0.5 wt %, all the tantalum component is not soluted in the beta alumina phase and the excessive tantalum component is precipitated in the intergranular phase as a different phase. To promote this solution reaction, it is preferred that the particle size of raw material of tantalum oxide is smaller, especially less than 10 μm.

For example, a microscopic photograph of the beta alumina sintered body within the scope of the invention is shown in FIG. 5, and a microscopic photograph of the beta alumina sintered body without the scope of the invention, in which a grain growth is detected, is shown in FIG. 6. As shown in FIG. 6, the strength is decreased when a grain growth is detected.

By adding predetermined amounts of magnesium oxide and/or lithium oxide, and tantalum oxide according to the invention, it is possible to obtain a beta alumina sintered body having a high sodium ion conductivity, a fine particle size and a high strength.

In case of further adding 0.1~2.0 wt % of zirconium oxide, since predetermined amounts of tantalum oxide and zirconium oxide are included in a beta alumina sintered body functioning as a solid electrolyte, it is possible to obtain a beta alumina sintered body having a higher sodium ion conductivity and a wider sintering temperature range.

Moreover, as to an addition timing of zirconium oxide, it is preferred to add it into the raw materials at mixing step or to add it into the $\beta''$ alumina powders obtained by calcining raw material powders of the other components. The reason for limiting an additional amount of zirconium oxide as 0.1~2 wt % is as follows.

If an amount of zirconium oxide is more than 2.0 wt %, an excessive zirconium component is precipitated in the intergranular phase, and a relative resistance is increased due to the thus precipitated zirconium component. Contrary to this, if an amount of zirconium oxide is less than 0.1 wt %, an effect of widening the range of sintering temperature is not sufficiently achieved.

BRIEF DESCRIPTION OF THE DRAWINGS

FIG. 1 is a schematic view showing an X-ray diffraction pattern of a beta alumina sintered body indicated as sample No. 6a in Table 1 according to the invention;

FIG. 2 is a schematic view illustrating an X-ray diffraction pattern of a beta alumina sintered body indicated as sample No. 1d in Table 1 according to the relative example;

FIG. 3 is a graph depicting a relation between an additional amount of tantalum oxide and (202) peak of tantalum oxide;

FIG. 4 is a graph showing a relation between an additional amount of tantalum oxide and a relative resistance;

FIG. 5 is a photograph illustrating a microstructure indicated as sample No. 6a in Table 1 according to the invention; and FIG. 6 is a photograph depicting a microstructure indicated as sample No. 1b in Table 1 according to the relative example.

DESCRIPTION OF THE PREFERRED EMBODIMENTS

Hereinafter, actual embodiments will be explained.

Embodiment 1

Alpha alumina powders having a purity of above 99.9%, $Na_2CO_3$ powders, MgO powders, $Li_2O$ powders, $Ta_2O_3$ powders were mixed with each other so as to obtain raw material powders having a composition shown in Table 1. Then, the raw material powders were crushed in a ball mill by using ethanol, and the thus crushed raw material powders were calcined at 1200° C. for 4 hours so as to synthesize $\beta''$ alumina powder raw materials. Then, the $\beta''$ alumina powder raw materials were further crushed in a ball mill by using ethanol to obtain $\beta''$ alumina powders. The thus obtained $\beta''$ alumina powders were granulated and preliminarily formed by using a metal mold so as to obtain a block specimen having a dimension of length: 50 mm, width: 25 mm, thickness: 7 mm. Then, the block specimen was formed under an isostatic pressure of 2.5 ton/cm², and the formed block specimen was sintered at a predetermined temperature for 1 hour in MgO crucible.

With respect to the block specimen of the beta alumina sintered body obtained in this manner, a bulk density was measured by a buoyancy method using butanol. Moreover, a stick-type specimen was cut out from the block specimen, and a flexural strength using four support points and a relative resistance at 350° C. were measured with respect to the stick-type specimen. The relative resistance was measured by a complex impedance method using four terminals in which use was made of $NaNO_3$-$NaNO_2$ eutectic salts as electrodes. The crystal phase of the sintered body within the scope of the invention consists mainly of $\beta''$ alumina, and a little amount of $\beta$ alumina or sodium aluminate was included according to circumstances. The results of the above measurements were shown in Table 1. Moreover, the results of the measurements without the scope of the invention were also indicated in Table 1 as relative examples.

phase. Further, it is detected that the compound is composed of a crystal phase of sodium tantalate.

TABLE 1(a)

| Sample No. | | $Na_2O$ (wt %) | MgO (wt %) | $Li_2O$ (wt %) | $Ta_2O_5$ (wt %) | $Al_2O_3$ (wt %) | Sintering temperature (°C.) | Relative resistance (350° C., $\Omega \cdot cm$) | Flexural strength (MPa) | Bulk density (g/cc) | Crystal phase |
|---|---|---|---|---|---|---|---|---|---|---|---|
| Present invention | 1 | 9.0 | 5.5 | — | 0.2 | remainder | 1600 | 2.3 | 160 | 3.14 | $\beta''$ |
| | 2 | 10.0 | 4.5 | — | 0.2 | remainder | 1590 | 2.7 | 200 | 3.22 | $\beta''$, NA |
| | 3 | 9.3 | 5.0 | — | 0.2 | remainder | 1590 | 2.4 | 240 | 3.24 | $\beta''$, NA |
| | 4 | 9.7 | 4.2 | — | 0.2 | remainder | 1590 | 2.4 | 240 | 3.24 | $\beta''$, NA |
| | 5 | 8.7 | 4.4 | — | 0.2 | remainder | 1600 | 2.3 | 200 | 3.21 | $\beta''$ |
| | 6a | 9.3 | 3.7 | — | 0.2 | remainder | 1590 | 2.5 | 250 | 3.24 | $\beta''$, NA |
| | 6b | 9.3 | 3.7 | — | 0.5 | remainder | 1570 | 2.5 | 240 | 3.25 | $\beta''$, NA |
| | 6c | 9.3 | 3.7 | — | 0.05 | remainder | 1600 | 2.5 | 250 | 3.24 | $\beta''$, NA |
| | 7 | 8.5 | 4.3 | — | 0.2 | remainder | 1620 | 2.2 | 170 | 3.17 | $\beta''$ |
| | 8 | 8.0 | 3.5 | — | 0.2 | remainder | 1620 | 2.8 | 180 | 3.16 | $\beta''$, $\beta$ |
| | 9 | 9.0 | 3.2 | — | 0.2 | remainder | 1590 | 2.8 | 240 | 3.24 | $\beta''$, $\beta$, NA |
| | 10 | 9.0 | — | 0.5 | 0.1 | remainder | 1580 | 2.5 | 220 | 3.23 | $\beta''$ |
| | 11 | 8.7 | — | 1.5 | 0.2 | remainder | 1550 | 2.5 | 210 | 3.24 | $\beta''$ |
| | 12 | 9.2 | 3.2 | 0.5 | 0.05 | remainder | 1580 | 2.6 | 230 | 3.23 | $\beta''$, $\beta$ |

TABLE 1(b)

| Sample No. | | $Na_2O$ (wt %) | MgO (wt %) | $Li_2O$ (wt %) | $Ta_2O_5$ (wt %) | $Al_2O_3$ (wt %) | Sintering temperature (°C.) | Relative resistance (350° C., $\Omega \cdot cm$) | Flexural strength (MPa) | Bulk density (g/cc) | Crystal phase |
|---|---|---|---|---|---|---|---|---|---|---|---|
| Relative example | 1a | 9.3 | 3.7 | — | 0 | remainder | 1600 | 3.2 | 240 | 3.24 | $\beta''$, NA |
| | 1b | 9.3 | 3.7 | — | 0 | remainder | 1650 | 2.6 | 90 | 3.22 | $\beta''$ |
| | 1c | 9.3 | 3.7 | — | 1.0 | remainder | 1550 | 3.0 | 210 | 3.25 | $\beta''$, NA, NT |
| | 1d | 9.3 | 3.7 | — | 2.0 | remainder | 1530 | 3.2 | 200 | 3.27 | $\beta''$, NT |
| | 2 | 8.2 | 5.7 | — | 0.2 | remainder | 1620 | 5.0 | 100 | 2.87 | $\beta''$, $\beta$, Spi |
| | 3 | 9.5 | 6.0 | — | 0.2 | remainder | 1640 | 4.6 | 110 | 3.10 | $\beta''$, NA, Spi |
| | 4 | 10.5 | 4.0 | — | 0.2 | remainder | 1590 | 3.3 | 220 | 3.22 | $\beta''$, NA |
| | 5 | 10.2 | 2.7 | — | 0.2 | remainder | 1590 | 3.5 | 240 | 3.23 | $\beta''$, $\beta$, NA |
| | 6 | 9.0 | 2.5 | — | 0.2 | remainder | 1590 | 3.3 | 240 | 3.24 | $\beta''$, $\beta$ |
| | 7 | 7.5 | 4.5 | — | 0.2 | remainder | 1650 | ← not completely sintered → | | | $\beta''$, $\beta$, Spi |
| | 8 | 9.0 | — | 0.5 | 0 | remainder | 1590 | 3.2 | 240 | 3.23 | $\beta''$ |
| | 9 | 9.0 | — | 0.05 | 0.1 | remainder | 1600 | 3.5 | 230 | 3.23 | $\beta''$, $\beta$ |
| | 10 | 9.0 | — | 2.5 | 0.2 | remainder | 1580 | 3.0 | 90 | 3.19 | $\beta''$ |
| | 11 | 8.7 | — | 0.5 | 1.0 | remainder | 1550 | 3.2 | 180 | 3.22 | $\beta''$, $\beta$, NT |
| | 12 | 9.2 | 3.0 | 0.5 | 2.0 | remainder | 1580 | 3.6 | 170 | 3.21 | $\beta''$, $\beta$, NT |

Note)
$\beta''$: $\beta''$-$Al_2O_3$.
$\beta$: $\beta$-$Al_2O_3$.
NA: $NaAlO_2$.
Spi: $MgAl_2O_4$.
NT: $NaTaO_3$ As can be understood from Table 1, all the specimens according to the invention have such characteristics that a relative resistance at 350° C. is below 3 $\Omega$·cm and a flexural strength using four support points is above 150 MPa. Especially, the specimens including 8.7~9.7 wt % of sodium oxide, 3.5~5.0 wt % of magnesium oxide and/or 0.5~1.5 wt % of lithium oxide, 0.01~0.5 wt % of tantalum oxide, and a remainder of aluminum oxide show extraordinarily high sodium ion conductivity and flexural strength such that a relative resistance is below 2.5 $\Omega$-cm and a flexural strength using four support points is above 200 MPa. As shown in the relative examples, if a chemical composition of the specimen is out of the scope of the invention, a relative resistance becomes high, and a flexural strength becomes low. Moreover, in the specimens including more than 0.5 wt % of tantalum oxide which is out of the scope of the invention, a different phase including tantalum components is generated in the crystal phase. If an additional amount of $Ta_2O_5$ is more than 0.5 wt %, it is detected by means of an EPMA apparatus that an excess tantalum element which is not soluted in the beta alumina phase is existent in the intergranular phase, and a different phase is formed by a compound including the excess tantalum element being existent in the intergranular FIG. 1 is a schematic view showing an X-ray diffraction pattern of the beta alumina sintered body indicated as sample No. 6a in Table 1 according to the invention, and FIG. 2 is a schematic view illustrating an X-ray diffraction pattern of the beta alumina sintered body indicated as sample No. 1d in Table 1 according to the relative example, in which sodium tantalate is generated. Sample Nos. 6a, 6b, 6c according to the invention and sample Nos. 1a, 1c, 1d according to the relative example are the measuring results in which an additional amount of tantalum oxide is varied while an amount of $Na_2O$ and an amount of MgO are constant. FIG. 3 is a graph showing a relation between an additional amount of tantalum oxide and a peak strength of (202) peak of sodium tantalate on the X-ray diffraction patterns measured at the same condition. Moreover, a relation between an amount of $Ta_2O_5$ and a relative resistance is shown in FIG. 4. The relative resistance is constant till an amount of $Ta_2O_5$ is 0.5 wt %, and a sodium ion conductivity is improved by about 35% as compared with the sintered body to which no tantalum oxide is added. If an amount of $Ta_2O_5$ is more than 0.5 wt %, the relative resistance is increased. It seems that this is because sodium tantalate is precipitated in the intergranular phase.

Moreover, FIG. 5 shows a microscopic photograph of sample No. 6a according to the invention, and FIG. 6 shows a microscopic photograph of sample No. 1b according to the relative example. The sample No. 1b has the same chemical composition as that of the sample No. 1a, and the sintering temperature is increased as compared with the sample No. 1a so as to promote a grain growth. In this manner, by growing a particle size, sodium ion conductivity is improved by about 20%, but the strength is decreased by about 60%.

Embodiment 2

Alpha alumina powders having a purity of above 99.9%, $Na_2CO_3$ powders, MgO powders, $Li_2O$ powders, $Ta_2O_5$ powders and $ZrO_2$ powders were mixed with each other so as to obtain raw material powders having chemical compositions shown in Table 2. It should be noted that $Ta_2O_5$ and $ZrO_2$ are not included in the alpha alumina powders. The thus obtained raw material powders were further crushed in a ball mill by using ethanol. The thus crushed raw material powders were granulated and preliminarily formed by using a metal mold so as to obtain a block specimen having a dimension of length: 50 mm, width: 25 mm, thickness: 7 mm. Then, the block specimen was formed under an isostatic pressure of 2.5 ton/cm², and the formed block specimen was sintered at a predetermined temperature for 1 hour in MgO crucible. In this case, a sintering temperature was varied near 1600° C. by every 10° C. so as to obtain sintered bodies which were sintered at various sintering temperatures.

With respect to the block specimens of beta alumina sintered bodies obtained in this manner, a bulk density was measured by a buoyancy method using butanol. Moreover, a stick-type specimen was cut out from the block specimen, and a flexural strength using four support points was measured with respect to the stick-type specimen. Further, a range of sintering temperatures, which can obtain the characteristics such that a bulk density is above 3.2 g/cm³ and a flexural strength is above 180 MPa, was measured. Furthermore, relative resistances of the stick-type specimens obtained by sintering the formed body at the thus measured range of sintering temperatures were also measured. The relative resistance was measured by a complex impedance method using four terminals in which use is made of $NaNO_3$-$NaNO_2$ eutectic salts as electrodes. The results of the above measurements were shown in Table 2. Moreover, the results of the measurements without the scope of the invention were also indicated in Table 2 as relative examples.

TABLE 2(a)

| Sample No. | | $Na_2O$ (wt %) | MgO (wt %) | $Li_2O$ (wt %) | $Ta_2O_5$ (wt %) | $ZrO_2$ (wt %) | $Al_2O_3$ (wt %) | Range of most suitable sintering temperatures (°C.) | Variation of relative resistance in the sintering temperature range (Ω · cm) | Crystal phase |
|---|---|---|---|---|---|---|---|---|---|---|
| Present | 21 | 9.0 | 4.0 | — | 0.02 | 0.5 | remainder | 80 | 2.1–2.5 | β", NA, ZR |
| invention | 22 | 9.0 | 4.0 | — | 0.05 | 0.5 | remainder | 100 | 2.0–2.3 | β", NA, ZR |
| | 23 | 9.0 | 4.0 | — | 0.1 | 0.5 | remainder | 100 | 2.0–2.3 | β", NA, ZR |
| | 24 | 9.0 | 4.0 | — | 0.3 | 0.5 | remainder | 80 | 2.2–2.6 | β", NA, ZR |
| | 25 | 9.0 | 4.0 | — | 0.5 | 0.5 | remainder | 80 | 2.4–2.8 | β", NA, ZR |
| | 26 | 9.0 | 4.0 | — | 0.1 | 0.1 | remainder | 80 | 2.0–2.3 | β", NA, ZR |
| | 27 | 9.0 | 4.0 | — | 0.1 | 1.0 | remainder | 100 | 2.0–2.3 | β", NA, ZR |
| | 28 | 9.0 | 4.0 | — | 0.1 | 2.0 | remainder | 90 | 2.5–2.9 | β", NA, ZR |
| | 29 | 8.0 | 3.0 | — | 0.1 | 0.5 | remainder | 100 | 2.1–2.3 | β", β, ZR |
| | 30 | 8.0 | 3.0 | — | 0.5 | 0.5 | remainder | 90 | 2.5–2.8 | β", β, ZR |
| | 31 | 8.0 | 3.0 | — | 0.1 | 1.0 | remainder | 110 | 2.0–2.3 | β", β, ZR |
| | 32 | 9.5 | 3.5 | — | 0.05 | 0.5 | remainder | 100 | 2.1–2.3 | β", β, NA, ZR |
| | 33 | 9.5 | 3.5 | — | 0.1 | 1.0 | remainder | 110 | 2.1–2.3 | β", β, NA, ZR |
| | 34 | 9.0 | — | 0.5 | 0.05 | 0.5 | remainder | 100 | 2.0–2.3 | β", β, ZR |
| | 35 | 9.0 | — | 1.5 | 0.2 | 0.5 | remainder | 90 | 2.3–2.6 | β", β, ZR |
| | 36 | 8.7 | 3.0 | 0.5 | 0.05 | 0.5 | remainder | 100 | 2.0–2.3 | β", β, ZR |
| | 37 | 8.7 | 3.0 | 1.5 | 0.1 | 2.0 | remainder | 80 | 2.5–2.7 | β", β, ZR |

TABLE 2(b)

| Sample No. | | $Na_2O$ (wt %) | MgO (wt %) | $Li_2O$ (wt %) | $Ta_2O_5$ (wt %) | $ZrO_2$ (wt %) | $Al_2O_3$ (wt %) | Range of most suitable sintering temperatures (°C.) | Variation of relative resistance in the sintering temperature range (Ω · cm) | Crystal phase |
|---|---|---|---|---|---|---|---|---|---|---|
| Relative | 21 | 9.0 | 4.0 | — | 0 | 0 | remainder | 30 | 3.1–3.6 | β", NA |
| Example | 22 | 9.0 | 4.0 | — | 0 | 0.5 | remainder | 60 | 3.0–3.4 | β", NA, ZR |
| | 23 | 9.0 | 4.0 | — | 0.1 | 0 | remainder | 40 | 2.2–2.6 | β", NA |
| | 24 | 9.0 | 4.0 | — | 0.1 | 0.05 | remainder | 30 | 2.3–2.7 | β", NA, ZR |
| | 25 | 9.0 | 4.0 | — | 1.0 | 0.5 | remainder | 50 | 3.3–3.8 | β", NA, ZR, NT |
| | 26 | 9.0 | 4.0 | — | 0.1 | 3.0 | remainder | 60 | 3.2–3.6 | β", NA, ZR |
| | 27 | 10.5 | 6.0 | — | 0.05 | 0.5 | remainder | 20 | 3.8–3.9 | β", NA, Spi, ZR |
| | 28 | 8.5 | 2.5 | — | 0.1 | 2.0 | remainder | 40 | 3.4–3.7 | β", β, NA, ZR |
| | 29 | 8.0 | 3.0 | — | 2.0 | 1.0 | remainder | 40 | 3.4–3.8 | β", β, ZR, NT |
| | 30 | 9.0 | — | 0.5 | 0 | 0 | remainder | 30 | 3.2–3.5 | β" |
| | 31 | 9.0 | — | 2.5 | 0.1 | 1.0 | remainder | 30 | 3.0–3.3 | β", ZR |
| | 32 | 9.0 | — | 0.5 | 1.0 | 1.0 | remainder | 40 | 3.4–3.7 | β", ZR, NT |

TABLE 2(b)-continued

| Sample No. | Na$_2$O (wt %) | MgO (wt %) | Li$_2$O (wt %) | Ta$_2$O$_5$ (wt %) | ZrO$_2$ (wt %) | Al$_2$O$_3$ (wt %) | Range of most suitable sintering temperatures *(°C.) | Variation of relative resistance in the sintering temperature range ($\Omega \cdot$ cm) | Crystal phase |
|---|---|---|---|---|---|---|---|---|---|
| 33 | 8.7 | 3.0 | 0.5 | 1.0 | 0.5 | remainder | 20 | 3.3–3.6 | $\beta''$, ZR, NT |

Note)
$\beta''$: $\beta''$-Al$_2$O$_3$.
$\beta$: $\beta$-Al$_2$O$_3$.
NA: NaAlO$_2$.
Spi: MgAl$_2$O$_4$.
ZR: ZrO$_2$.
NT: NaTaO$_3$
*Range of most suitable sintering temperatures: range of sintering temperatures such that bulk density is above 3.20 g/cm$^3$ and flexural strength is above 180 MPa As shown in Table 2, all the specimens according to the invention have a range of sintering temperatures of above 80° C. which can achieve the characteristics such that a bulk density is above 3.2 g/cm$^3$ and a flexural strength is above 180 MPa, and also have a relative resistance of below 2.9 $\Omega$·cm. Especially, the specimens including predetermined amounts of Na$_2$O, MgO and/or Li$_2$O within the scope of the invention, 0.05–0.1 wt % of tantalum oxide and 0.5–1.0 wt % of zirconium oxide have a range of sintering temperatures of above 100° C. and a relative resistance of below 2.3 $\Omega$·cm, and thus show a wide range of sintering temperatures and an extraordinarily low relative resistance. Moreover, if a chemical composition is varied by varying an amount of Na$_2$O or MgO and/or Li$_2$O within the scope of the invention, the same effects as mentioned above can be obtained. As shown in the comparative example, if a chemical composition is out of the scope of the invention, a range of sintering temperatures becomes narrow or a relative resistance becomes high.

Moreover, in the specimen to which only ZrO$_2$ is added, a range of sintering temperatures is extended only by 30° C. as compared with the specimen to which no ZrO$_2$ is added. Further, in the specimen to which only Ta$_2$O$_5$ is added, a relative resistance becomes less than 2.6 $\Omega$·cm, but a range of sintering temperatures is extended only by 10° C.

As mentioned above in detail, according to the invention, since predetermined amounts of tantalum oxide and zirconium oxide and magnesium oxide and/or lithium oxide are added in the beta alumina sintered body and no tantalum component is existent in an intergranular phase, a range of sintering temperatures of the beta alumina sintered body according to the invention is extended by more than 50° C. as compared with the beta alumina sintered body to which no tantalum oxide and zirconium oxide are added, and a sodium ion conductivity is improved by about 35%.

What is claimed is:

1. A $\beta''$-alumina sintered body having a $\beta''$-alumina phase consisting essentially of 8.0–10.0 wt % of sodium oxide, 0.01–0.5 wt % of tantalum oxide, at least one oxide selected from the group consisting of magnesium oxide in the amount of 3.0–5.5 wt % and lithium oxide in the amount of 0.1–2.0 wt %, and the remainder being substantially aluminum oxide, wherein said tantalum oxide is completely soluble and contained entirely in said $\beta''$-alumina phase.

2. The $\beta''$-alumina sintered body of claim 1, further comprising 0.1–2.0 wt % of zirconium oxide.

3. The $\beta''$-alumina sintered body of claim 1, wherein said sintered body has a density not less than 3.2 g/cm$^3$ and a flexural strength not less than 180 MPa.

4. A method of manufacturing a $\beta''$-alumina sintered body comprising the steps of:

mixing raw material powders consisting essentially of 8.0–10.0 wt % of sodium oxide, 0.01–0.5 wt % of tantalum oxide, at least one oxide selected from the group consisting of magnesium oxide in an amount of 3.0–5.5 wt % and lithium oxide in an amount of 0.1–2.0 wt %;

and the remainder being substantially aluminum oxide;

calcining said raw material powders;

forming the raw material powders to obtain a formed body; and sintering the formed body to obtain a $\beta''$-alumina sintered body wherein said tantalum oxide is completely soluble in said $\beta''$-alumina phase and contained entirely in said $\beta''$-alumina phase.

5. The method of claim 4, wherein said raw materials further comprise 0.1–2.0 wt % of zirconium oxide.

* * * * *